US012794286B2

(12) United States Patent
Yoshimoto

(10) Patent No.: US 12,794,286 B2
(45) Date of Patent: Nov. 10, 2026

(54) ROTOR AND ROTATING ELECTRIC MACHINE

(71) Applicant: DENSO CORPORATION, Kariya-city (JP)

(72) Inventor: Takao Yoshimoto, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 205 days.

(21) Appl. No.: 18/739,077

(22) Filed: Jun. 10, 2024

(65) Prior Publication Data

US 2024/0333053 A1 Oct. 3, 2024

Related U.S. Application Data

(63) Continuation of application No. PCT/JP2022/032322, filed on Aug. 29, 2022.

(30) Foreign Application Priority Data

Dec. 9, 2021 (JP) ................................ 2021-200266

(51) Int. Cl.
*H02K 1/27* (2022.01)
*H02K 1/276* (2022.01)

(52) U.S. Cl.
CPC .................................. *H02K 1/276* (2013.01)

(58) Field of Classification Search
CPC ................................ H02K 1/27; H02K 1/276
USPC ............ 310/156.38, 156.39, 156.45, 156.46
See application file for complete search history.

(56) References Cited

U.S. PATENT DOCUMENTS 7,843,100 B2 * 11/2010 Blissenbach ......... H02K 1/2766 310/156.43
2008/0164780 A1 * 7/2008 Jonasson .............. H02K 1/2766 310/156.08
2009/0026868 A1 * 1/2009 Morgante ............. H02K 1/2766 903/906
2010/0237735 A1 * 9/2010 Blissenbach ............. H02K 1/02 310/156.53
2012/0256508 A1 * 10/2012 Suzuki ................. H02K 1/2766 310/156.38

(Continued)

FOREIGN PATENT DOCUMENTS

JP 2006-109683 A 4/2006
JP 2011-004480 A 1/2011

(Continued)

*Primary Examiner* — Rashad H Johnson
(74) *Attorney, Agent, or Firm* — Oliff PLC

(57) ABSTRACT

A rotor includes a rotor core formed of core sheets, and permanent magnets. Each of magnetic poles of the rotor includes one of the permanent magnets and one of outer core portions of the rotor core. Each of the outer core portions of the rotor core is constituted of outer core portions of the core sheets which are laminated together. Moreover, each of the outer core portions of the rotor core is supported by a plurality of bridge portions which include an outer peripheral bridge portion located at one of a pair of radially outer ends of a corresponding magnet-receiving hole. Furthermore, each of the outer core portions of the rotor core includes, at least, those outer core portions of the core sheets each of which is supported by a single bridge piece of the core sheet; the single bridge piece constitutes a piece of the outer peripheral bridge portion.

11 Claims, 10 Drawing Sheets

(56) References Cited

U.S. PATENT DOCUMENTS

| | | | | |
|---|---|---|---|---|
| 2013/0119807 | A1* | 5/2013 | Nakada | H02K 1/2766 310/156.38 |
| 2013/0169100 | A1* | 7/2013 | Tsai | H02K 1/2766 310/156.38 |
| 2013/0270958 | A1* | 10/2013 | Takahashi | H02K 1/274 310/156.38 |
| 2014/0042860 | A1* | 2/2014 | Rahman | H02K 1/2766 310/156.38 |
| 2014/0339945 | A1* | 11/2014 | Fiseni | H02K 1/2766 29/598 |
| 2017/0117781 | A1* | 4/2017 | Yoshida | H02K 15/03 |

FOREIGN PATENT DOCUMENTS

| | | | |
|---|---|---|---|
| JP | 2015-065764 | A | 4/2015 |
| JP | 2016-063620 | A | 4/2016 |
| JP | 2018-085779 | A | 5/2018 |
| JP | 2019-041483 | A | 3/2019 |

* cited by examiner

1ST POSITION

2ND POSITION
(ROTATED BY 45°)

(1ST COMPARATIVE EXAMPLE)

(2ND COMPARATIVE EXAMPLE)

ROTOR AND ROTATING ELECTRIC MACHINE

CROSS-REFERENCE TO RELATED APPLICATIONS

The present application is a continuation application of International Application No. PCT/JP2022/032322 filed on Aug. 29, 2022, which is based on and claims priority from Japanese Patent Application No. 2021-200266 filed on Dec. 9, 2021. The entire contents of these applications are incorporated by reference into the present application.

BACKGROUND

1 Technical Field

The present disclosure relates to interior permanent magnet rotors and rotating electric machines.

2 Description of Related Art

In the field of rotating electric machines, interior permanent magnet (i.e., so-called IPM) rotors are well known which have permanent magnets embedded at radially inner positions in a rotor core. The interior permanent magnet rotors are configured to obtain both magnet torque generated by the permanent magnets and reluctance torque generated by outer core portions located radially outside the permanent magnets.

In the interior permanent magnet rotors, the permanent magnets are embedded in a folded shape (e.g., a V-shape or a U-shape) that is convex radially inward in an axial view (see, for example, Japanese Patent Application Publication No. JP 2018-085779 A). By setting the folded shape of the permanent magnets to be deeply convex radially inward, it is possible to form the outer core portions to be large. The larger the outer core portions of the rotor core, the more reluctance torque can be obtained and thus the more improvement in the torque of the rotating electric machine can be achieved.

SUMMARY

In the above-described interior permanent magnet rotors, magnet-receiving holes are formed in the rotor core to receive the permanent magnets therein. Moreover, the outer core portions, which are respectively surrounded by the magnet-receiving holes, are connected with a main body portion of the rotor core by narrow connection portions called bridge portions. The bridge portions are portions through which leakage of part of effective magnetic flux occurs. Therefore, in order to reduce leakage magnetic flux and thereby increase the torque of the rotating electric machine, it is desirable to minimize the size of the bridge portions and/or eliminate some of the bridge portions.

However, on the other hand, the bridge portions are also portions that support the outer core portions with respect to a peripheral portion of the rotor core. Therefore, if minimization of the size of the bridge portions and/or elimination of the bridge portions are improperly performed, the support rigidity of the outer core portions may be lowered, thereby lowering, for example, the strength of the rotor against the centrifugal force.

The present disclosure has been accomplished in view of the above problems.

According to a first aspect of the present disclosure, a rotor is provided. The rotor includes: a rotor core including a plurality of core sheets that are laminated together and having magnet-receiving holes formed in a folded shape that is convex radially inward; and permanent magnets embedded respectively in the magnet-receiving holes of the rotor core. Moreover, the rotor includes a plurality of magnetic pole. Each of the magnetic poles includes one of the permanent magnets which is located on a radially inner side in the rotor core and one of outer core portions of the rotor core which is located radially outside the permanent magnet. Each of the outer core portions of the rotor core is constituted of outer core portions of the core sheets which are laminated together. Moreover, each of the outer core portions of the rotor core is supported with respect to a peripheral portion of the rotor core by a plurality of bridge portions which include a bridge portion located at one of a pair of radially outer ends of a corresponding one of the magnet-receiving holes formed in the folded shape. The support of each of the outer core portions of the rotor core by the plurality of bridge portions is established by laminating the core sheets so that each of the outer core portions of the rotor core includes, at least, those outer core portions of the core sheets each of which is supported by a single bridge piece of the core sheet; the single bridge piece constitutes a piece of the bridge portion located at one of the pair of radially outer ends of the corresponding magnet-receiving hole.

According to a second aspect of the present disclosure, a rotating electric machine is provided which includes a rotor and a stator. The rotor includes: a rotor core including a plurality of core sheets that are laminated together and having magnet-receiving holes formed in a folded shape that is convex radially inward; and permanent magnets embedded respectively in the magnet-receiving holes of the rotor core. The stator is configured to apply a rotating magnetic field to the rotor. Moreover, the rotor includes a plurality of magnetic pole. Each of the magnetic poles includes one of the permanent magnets which is located on a radially inner side in the rotor core and one of outer core portions of the rotor core which is located radially outside the permanent magnet. Each of the outer core portions of the rotor core is constituted of outer core portions of the core sheets which are laminated together. Moreover, each of the outer core portions of the rotor core is supported with respect to a peripheral portion of the rotor core by a plurality of bridge portions which include a bridge portion located at one of a pair of radially outer ends of a corresponding one of the magnet-receiving holes formed in the folded shape. The support of each of the outer core portions of the rotor core by the plurality of bridge portions is established by laminating the core sheets so that each of the outer core portions of the rotor core includes, at least, those outer core portions of the core sheets each of which is supported by a single bridge piece of the core sheet; the single bridge piece constitutes a piece of the bridge portion located at one of the pair of radially outer ends of the corresponding magnet-receiving hole.

In the above rotor and rotating electric machine, each of the outer core portions, which are surrounded by the magnet-receiving holes and thus the permanent magnets, is supported with respect to the peripheral portion of the rotor core by the plurality of bridge portions which include the bridge portion located at one of the pair of radially outer ends of the corresponding magnet-receiving hole. Moreover, each of the outer core portions of the rotor core includes, at least, those outer core portions of the core sheets each of which is supported by a single bridge piece of the core sheet; the single bridge piece constitutes a piece of the bridge portion located at one of the pair of radially outer ends of the corresponding magnet-receiving hole. Upon laminating the core sheets to form the rotor core, the support of each of the outer core portions of the rotor core by the plurality of bridge portions is established. Consequently, the support rigidity of the outer core portions of the rotor core, each of which is supported by the plurality of bridge portions, becomes sufficiently high; thus, the strength of the rotor against the centrifugal force can be ensured. Moreover, since each of the outer core portions of the rotor core includes those outer core portions of the core sheets each of which is supported by a single bridge piece of the core sheet, bridge pieces of the core sheets, which constitute the bridge portions supporting the outer core portions of the rotor core, are moderately spaced apart from one another. Consequently, magnetic flux leaking through the bridge portions, which is a concern, can be reduced.

DESCRIPTION OF EMBODIMENTS

Hereinafter, an embodiment of a rotor and a rotating electric machine will be described.

Figure 1:
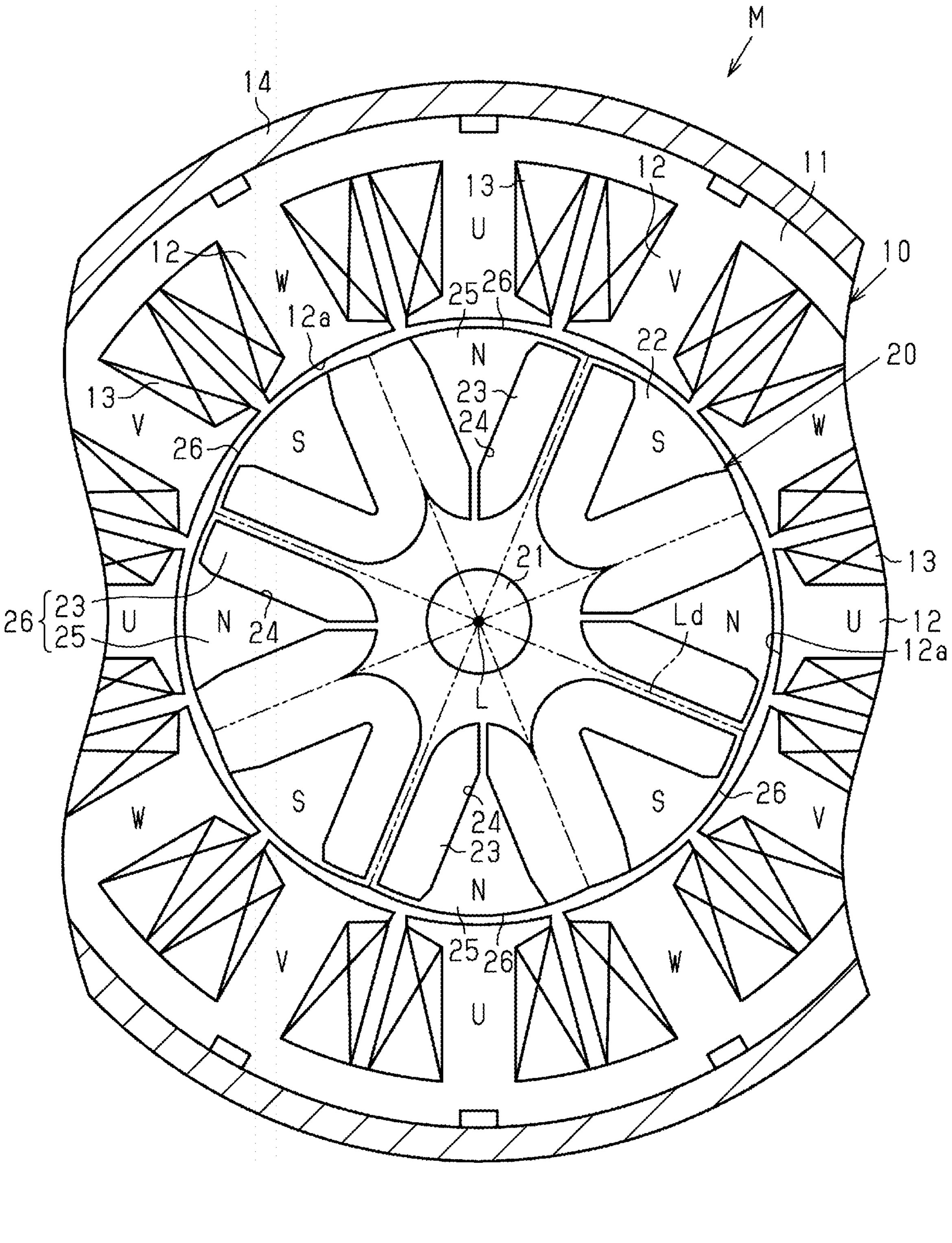
FIG. 1 is a configuration diagram of a rotating electric machine which includes an interior permanent magnet rotor according to an embodiment.

As shown in FIG. 1, a rotating electric machine M according to the present embodiment is configured as an interior permanent magnet brushless motor. The rotating electric machine M includes a substantially annular stator 10 and a substantially cylindrical rotor 20 that is rotatably arranged in a space radially inside the stator 10. The stator 10 is configured to apply a rotating magnetic field to the rotor 20. The rotor 20 is configured to rotate under the rotating magnetic field generated by the stator 10.

The stator 10 includes a substantially annular stator core 11. The stator core 11 is formed of a magnetic metal material. For example, the stator core 11 may be formed by laminating a plurality of magnetic steel sheets. The stator core 11 has a plurality (more particularly, twelve in the present embodiment) of teeth 12 extending radially inward and arranged at equal intervals in the circumferential direction. All the teeth 12 are identical in shape to each other. Each of the teeth 12 has a substantially T-shaped radially inner end portion (i.e., distal end portion) and a distal end surface 12*a* formed in an arc shape along an outer circumferential surface of the rotor 20. Windings 13 are wound around the twelve teeth 12 in a concentrated winding manner. That is, in the present embodiment, the number of magnetic poles of the stator 10 is set to 12. The windings 13 are connected in three phases to respectively function as a U-phase, a V-phase and a W-phase as shown in FIG. 1. Upon supply of electric power to the windings 13, the stator 10 generates the rotating magnetic field, thereby driving the rotor 20 to rotate. In addition, in the stator 10, an outer circumferential surface of the stator core 11 is fixed to an inner circumferential surface of a housing 14.

The rotor 20 includes a rotating shaft 21, a substantially cylindrical rotor core 22 having the rotating shaft 21 inserted in a central part thereof, and a plurality (more particularly, eight in the present embodiment) of permanent magnets 23 embedded at radially inner positions in the rotor core 22. That is, in the present embodiment, the number of magnetic poles of the rotor 20 is set to 8. The rotor 20 is rotatably arranged with respect to the stator 10, with the rotating shaft 21 supported by bearings (not shown) provided in the housing 14.

Figure 2:
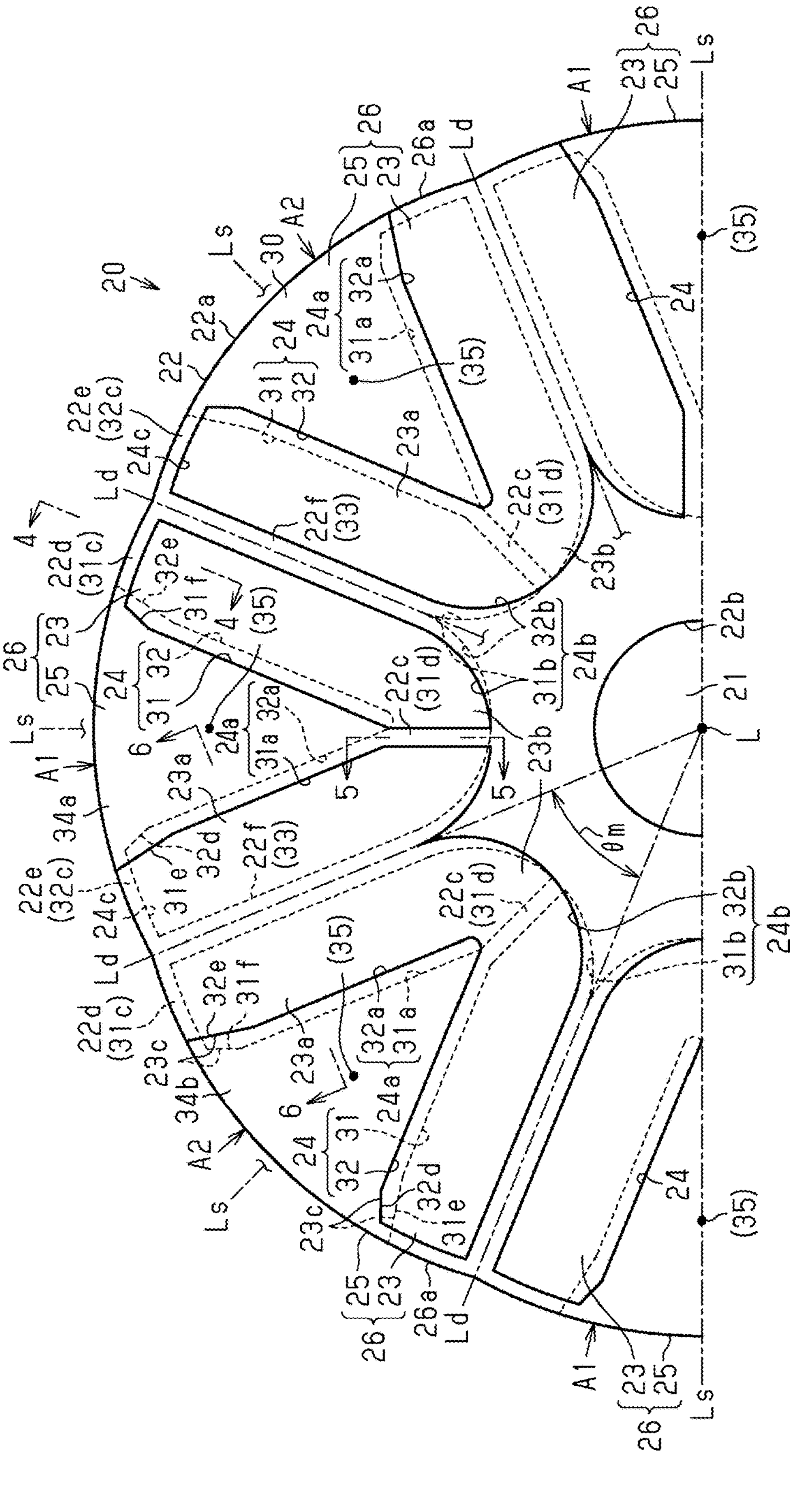
FIG. 2 is a plan view of the rotor according to the embodiment.

As shown in FIG. 2, the rotor core 22 has a plurality of magnet-receiving holes 24 for receiving the permanent magnets 23 therein. More particularly, in the present embodiment, eight magnet-receiving holes 24 are formed at equal intervals in the circumferential direction of the rotor core 22. Each of the magnet-receiving holes 24 penetrates the rotor core 22 in the axial direction thereof. Moreover, each of the magnet-receiving holes 24 has a folded substantially V-shape that is convex radially inward when viewed in the axial direction.

Each of the magnet-receiving holes 24 has a pair of straight portions 24*a* extending straight in an axial view and a curved portion 24*b* connecting radially inner ends of the pair of straight portions 24*a*. Moreover, for each of the magnet-receiving holes 24, the pair of straight portions 24*a* of the magnet-receiving hole 24 are formed to gradually approach each other as they extend from the radially outer side to the radially inner side. Furthermore, for each adjacent pair of the magnet-receiving holes 24, the two adjacent straight portions 24*a* of the pair of the magnet-receiving holes 24 are arranged side by side so as to be parallel to each other. Each of the straight portions 24*a* of the magnet-receiving holes 24 has its radially outer end 24*c* located near an outer circumferential surface 22*a* of the rotor core 22, and is partially open on the outer circumferential surface 22*a* (see FIG. 4). On the other hand, each of the curved portions 24*b* of the magnet-receiving holes 24 is located near a shaft insertion hole 22*b* which is formed in the central part of the rotor core 22 and in which the rotating shaft 21 is inserted. That is, in the present embodiment, each of the magnet-receiving holes 24 has a folded substantially V-shape that is deeply convex from the radially outer side toward the radially inner side.

In the present embodiment, in the rotor core 22, there are formed two types of magnet-receiving holes, i.e., magnet-receiving holes 24 of a first type A1 and magnet-receiving holes 24 of a second type A2. The magnet-receiving holes 24 of the first type A1 and the magnet-receiving holes 24 of the second type A2 are arranged alternately in the circumferential direction. That is, the magnet-receiving holes 24 of the first type A1 are arranged at intervals of one magnet-receiving hole 24 of the second type A2 in the circumferential direction; and the magnet-receiving holes 24 of the second type A2 are arranged at intervals of one magnet-receiving hole 24 of the first type A1 in the circumferential direction. Moreover, each of the magnet-receiving holes 24 of the first and second types A1 and A2 is constituted of first and second through-holes 31 and 32 of core sheets 30 (see FIGS. 3(*a*)-3(*b*)) that will be described later; the first and second through-holes 31 and 32 are arranged alternately in the axial direction. The order of arranging the first and second through-holes 31 and 32 in the axial direction in the magnet-receiving holes 24 of the first type A1 is different from that in the magnet-receiving holes 24 of the second type A2. Therefore, when viewed in the axial direction, the magnet-receiving holes 24 of the first type A1 appear to be different from the magnet-receiving holes 24 of the second type A2. However, the magnet-receiving holes 24 of the first type A1 actually have substantially the same configuration as the magnet-receiving holes 24 of the second type A2. The detailed configuration of the magnet-receiving holes 24 of the first and second types A1 and A2 will be described later.

In the present embodiment, the permanent magnets 23 are implemented by bonded magnets that are formed by molding and solidifying a magnet material; the magnet material is a mixture of a magnet powder and a resin. More specifically, in the present embodiment, the magnet-receiving holes 24 of the rotor core 22 serve as forming molds. The permanent magnets 23 are formed by: filling the magnet material, which has not been solidified, into the magnet-receiving holes 24 of the rotor core 22 by injection molding without any gaps remaining therein; and then solidifying the magnet material in the magnet-receiving holes 24. Consequently, the external shape of the permanent magnets 23 conforms to the shape of the magnet-receiving holes 24 of the rotor core 22. In addition, in the present embodiment, a samarium-iron-nitrogen-based (i.e., SmFeN-based) magnet powder is employed as the magnet powder for forming the permanent magnets 23. It should be noted that other rare-earth magnet powders may alternatively be employed as the magnet powder for forming the permanent magnets 23.

As shown in FIG. 2, since the permanent magnets 23 are formed directly in the magnet-receiving holes 24, the permanent magnets 23 have a shape corresponding to the magnet-receiving holes 24. That is, each of the permanent magnets 23 has a folded substantially V-shape that is convex radially inward when viewed in the axial direction. More specifically, each of the permanent magnets 23 has a pair of straight portions 23*a* and a curved portion 23*b* connecting radially inner ends of the pair of straight portions 23*a*. Moreover, for each of the permanent magnets 23, the pair of straight portions 23*a* of the permanent magnet 23 are located respectively in the pair of straight portions 24*a* of a corresponding one of the magnet-receiving holes 24; and the curved portion 23*b* of the permanent magnet 23 is located in the curved portion 24*b* of the corresponding magnet-receiving hole 24. Furthermore, for each of the permanent magnets 23, the pair of straight portions 23*a* of the permanent magnet 23 are formed to gradually approach each other as they extend from the radially outer side to the radially inner side. Moreover, for each adjacent pair of the permanent magnets 23, the two adjacent straight portions 23*a* of the pair of the permanent magnets 23 are arranged side by side so as to be parallel to each other. Each of the straight portions 23*a* of the permanent magnets 23 has its radially outer end located near the outer circumferential surface 22*a* of the rotor core 22, and is partially exposed on the outer circumferential surface 22*a* (see FIG. 4). On the other hand, each of the curved portions 23*b* of the permanent magnets 23 is located near the shaft insertion hole 22*b* which is formed in the central part of the rotor core 22 and in which the rotating shaft 21 is inserted. That is, in the present embodiment, each of the permanent magnets 23 has a folded substantially V-shape that is deeply convex from the radially outer side toward the radially inner side.

As shown in FIG. 1, those portions of the rotor core 22 which are located on the inner side of the folded substantially V-shape of the permanent magnets 23 and radially outside the permanent magnets 23 function as outer core portions 25 facing the stator 10 to generate reluctance torque. The number of the outer core portions 25 is equal to the number of the permanent magnets 23, i.e., equal to eight in the present embodiment. When viewed along the axial direction, each of the outer core portions 25 has a substantially triangular shape with one vertex oriented toward the central part of the rotor 20. The rotor 20 has a plurality of magnetic poles 26 each including one of the permanent magnets 23 and one of the outer core portions 25. In the present embodiment, the number of the magnetic poles 26 of the rotor 20 is set to eight. Moreover, in the present embodiment, each of the magnetic poles 26 has an outer peripheral surface 26*a* whose curvature is set to be greater than the curvature in the case of the outer circumferential surface 22*a* of the rotor core 22 being formed as a uniform circular surface. That is, in the present embodiment, the outer circumferential surface 22*a* of the rotor core 22 has a wavy shape that is slightly convex radially outward at each of the magnetic poles 26.

As described above, in the present embodiment, the magnet-receiving holes 24, in which the permanent magnets 23 are respectively received, include the magnet-receiving holes 24 of the first type A1 and the magnet-receiving holes 24 of the second type A2. Although the magnet-receiving holes 24 of the first type A1 appear to be different from the magnet-receiving holes 24 of the second type A2 in an axial view, all the magnet-receiving holes 24 of the first and second types A1 and A2 actually have substantially the same configuration. Accordingly, although the magnetic poles 26 (i.e., the permanent magnets 23 and the outer core portions 25) corresponding to the magnet-receiving holes 24 of the first type A1 appear to be different in shape and arrangement from those corresponding to the magnet-receiving holes 24 of the second type A2 in an axial view, all the magnetic poles 26 actually have substantially the same configuration. Hereinafter, the permanent magnets 23, the outer core portions 25 and thus the magnetic poles 26 are also classified into the first and second types A1 and A2 according to the types of the magnet-receiving holes 24 to which they correspond. In the rotor 20, there are defined eight magnetic-pole boundary lines Ld that are spaced at equal intervals in the circumferential direction; each of the magnetic-pole boundary lines Ld represents a boundary between an adjacent pair of the magnetic poles 26. In the present embodiment, the magnetic-pole opening angle θm of each of the magnetic poles 26, which is defined as the angle between each adjacent pair of the magnetic-pole boundary lines Ld, is set to 45° in mechanical angle. Moreover, each of the magnetic poles 26 has a magnetic-pole centerline Ls defined as the circumferential centerline between a corresponding adjacent pair of the magnetic-pole boundary lines Ld. In addition, each of the magnetic poles 26, which are substantially identical in configuration to each other, has a substantially axisymmetric shape with respect to the magnetic-pole centerline Ls thereof.

Each of the outer core portions 25 has three vertex portions connected, respectively by three connection portions called bridge portions, with a peripheral portion of the rotor core 22. Specifically, each of the outer core portions 25 has a radially inner vertex portion supported by a reinforcement bridge portion 22*c*. The reinforcement bridge portion 22*c* extends across the curved portion 24*b* of the corresponding magnet-receiving hole 24 in a width direction thereof, more particularly in a radial direction of the rotor core 22 in the present embodiment. Moreover, each of the outer core portions 25 also has two radially outer vertex portions supported respectively by two outer peripheral bridge portions 22*d* and 22*e*. The outer peripheral bridge portions 22*d* and 22*e* extend, respectively at the radially outer ends 24*c* of the pair of straight portions 24*a* of the corresponding magnet-receiving hole 24, in the circumferential direction of the rotor core 22.

Furthermore, in the rotor core 22, there are formed inter-pole bridge portions 22*f* each of which extends between an adjacent pair of the magnet-receiving holes 24. More specifically, each of the inter-pole bridge portions 22*f* radially extends between the two adjacent straight portions 24*a* of an adjacent pair of the magnet-receiving holes 24. Moreover, each of the inter-pole bridge portions 22*f*, the reinforcement bridge portions 22*c* and the outer peripheral bridge portions 22*d* and 22*e* is present or absent alternately in the core sheets 30, which are laminated in the axial direction, corresponding to the magnet-receiving holes 24 of the first and second types A1 and A2 (see FIGS. 4 to 6). Moreover, the order of presence or absence of each of the inter-pole bridge portions 22*f*, the reinforcement bridge portions 22*c* and the outer peripheral bridge portions 22*d* and 22*e* in the axial direction is opposite between the magnet-receiving holes 24 of the first type A1 and the magnet-receiving holes 24 of the second type A2. The detailed configuration of these bridge portions will be described later.

The permanent magnets 23, which are embedded in the magnet-receiving holes 24 of the rotor core 22, are magnetized, after solidification of the magnet material, by a magnetizing apparatus (not shown) located outside the rotor core 22. More specifically, each of the permanent magnets 23 is magnetized in its thickness direction. That is, each of the straight portions 24*a* of the permanent magnets 23 is magnetized in a direction perpendicular to the radial direction in which the straight portion 24*a* extends; and each of the curved portions 24*b* of the magnet-receiving holes 24 is magnetized in a radial direction. Moreover, all the permanent magnets 23 of the magnetic poles 26 are arranged along the circumferential direction of the rotor core 22 and magnetized so that the polarities of the permanent magnets 23 are alternately different in the circumferential direction. In this manner, the magnetic poles 26 are configured to obtain both magnet torque generated by the permanent magnets 23 and reluctance torque generated by the outer core portions 25.

Figure 3A:
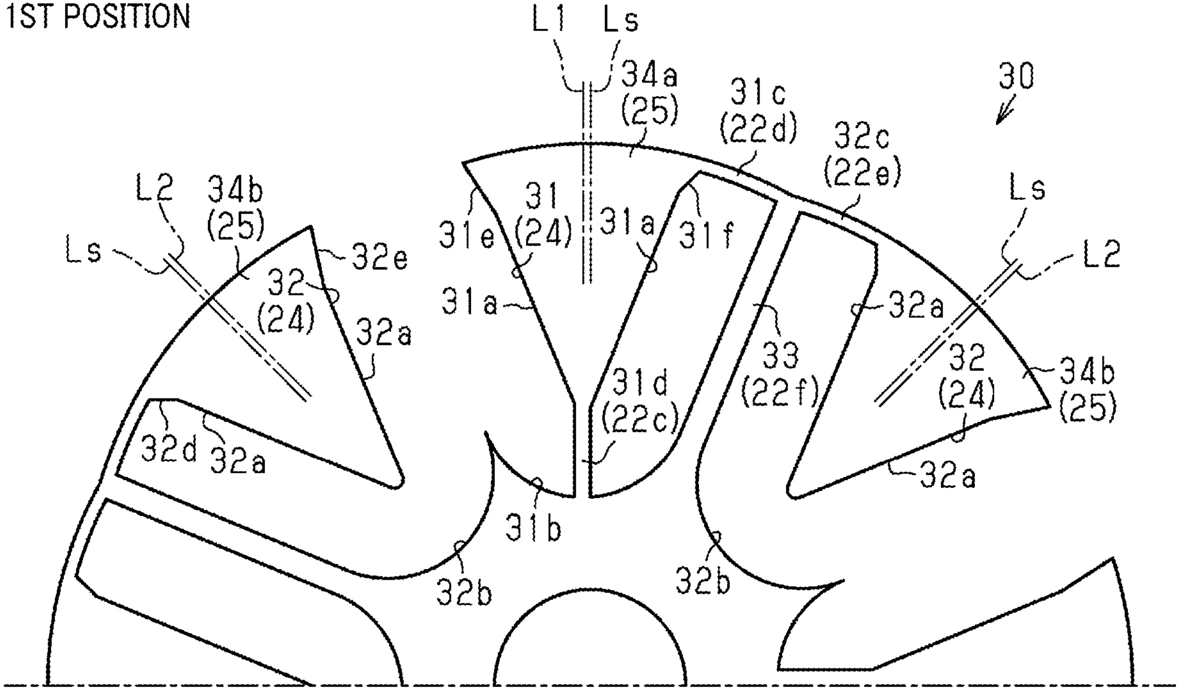
FIGS. 3(*a*) and 3(*b*) are plan views of a core sheet employed in the rotor according to the embodiment.
Figure 3B:
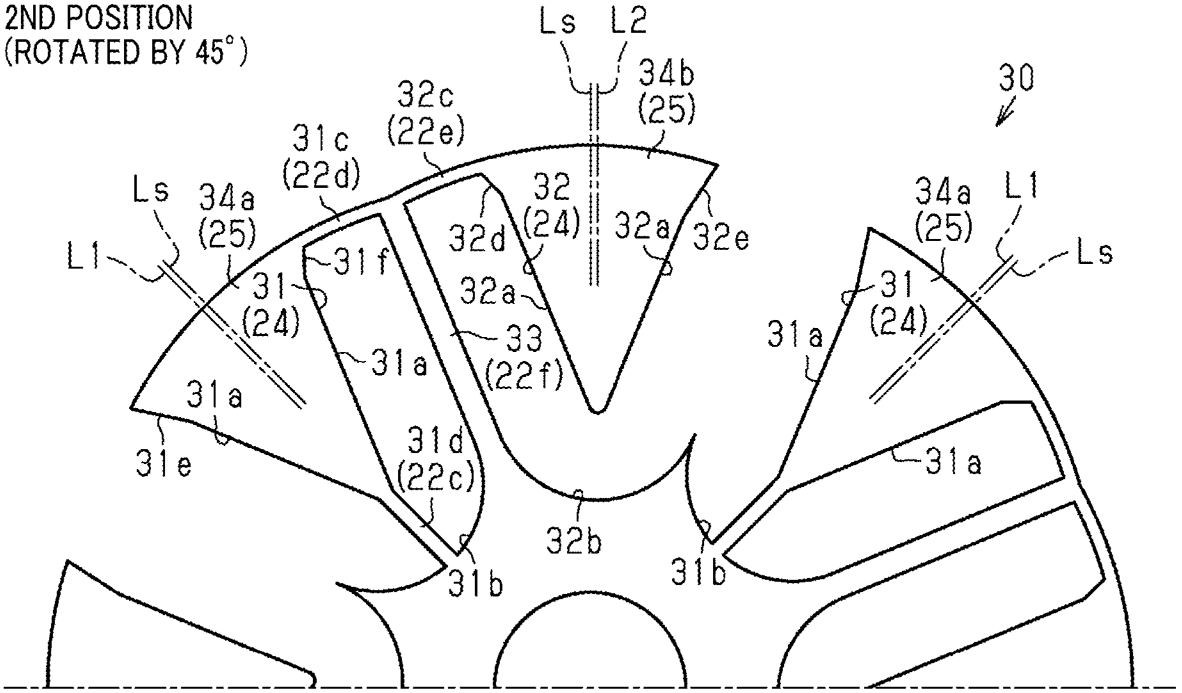

The rotor core 22 is formed by laminating a plurality of core sheets 30 in the direction of an axis L; the core sheets 30 are made of magnetic steel sheets. In the present embodiment, all the core sheets 30 employed in the rotor core 22 have the same configuration as shown in FIG. 3(*a*). Consequently, all the core sheets 30 can be easily managed as identical parts. In addition, the core sheet 30 shown in FIG. 3(*b*) appears at first glance to be different in shape from the core sheet 30 shown in FIG. 3(*a*). However, FIGS. 3(*a*) and 3(*b*) actually show the same core sheet 30 arranged at two different positions, i.e., at a first position in FIG. 3(*a*) and at a second position in FIG. 3(*b*); the second position is rotated with respect to the first position by 450 corresponding to one magnetic pole of the rotor 20.

In each of the core sheets 30, there are formed in a mixed manner two types of through-holes having different shapes, i.e., first through-holes 31 and second through-holes 32. Moreover, in each of the core sheets 30, the first through-holes 31 and the second through-holes 32 are arranged alternately in the circumferential direction. That is, the first through-holes 31 are arranged at intervals of one second through-hole 32 in the circumferential direction; and the second through-holes 32 are arranged at intervals of one first through-hole 31 in the circumferential direction. Each of the first and second through-holes 31 and 32 has a folded substantially V-shape that is convex radially inward. More specifically, each of the first through-holes 31 has a shape such that the radially inner ends of a pair of straight portions 31*a* are connected by a curved portion 31*b*. Similarly, each of the second through-holes 32 has a shape such that the radially inner ends of a pair of straight portions 32*a* are connected by a curved portion 32*b*.

Each of the first through-holes 31 is formed at a position where a circumferential centerline L1 of the first through-hole 31 is offset in the counterclockwise direction in FIG. 3(*a*) from the magnetic-pole centerline Ls of the corresponding magnetic pole 26. In contrast, each of the second through-holes 32 is formed at a position where a circumferential centerline L2 of the second through-hole 32 is offset in the clockwise direction in FIG. 3(*a*) from the magnetic-pole centerline Ls of the corresponding magnetic pole 26. Consequently, for each of the first through-holes 31 and that one of the second through-holes 32 which is adjacent to the first through-hole 31 in the clockwise direction, an adjacent pair of the straight portions 31*a* and 32*a* of the first and second through-holes 31 and 32 are spaced apart from each other. As a result, for each of the first through-holes 31 and that one of the second through-holes 32 which is adjacent to the first through-hole 31 in the clockwise direction, there is formed an inter-pole bridge piece 33 constituting a piece of the corresponding inter-pole bridge portion 22*f* of the rotor core 22. On the other hand, for each of the first through-holes 31 and that one of the second through-holes 32 which is adjacent to the first through-hole 31 in the counterclockwise direction, an adjacent pair of the straight portions 31*a* and 32*a* of the first and second through-holes 31 and 32 are merged with each other. As a result, for each of the first through-holes 31 and that one of the second through-holes 32 which is adjacent to the first through-hole 31 in the counterclockwise direction, there is formed no inter-pole bridge piece 33 constituting a piece of the corresponding inter-pole bridge portion 22*f* of the rotor core 22. In addition, in the present embodiment, for each of the first through-holes 31 and that one of the second through-holes 32 which is adjacent to the first through-hole 31 in the counterclockwise direction, the adjacent pair of the straight portions 31*a* and 32*a* of the first and second through-holes 31 and 32 are merged with each other at the corresponding magnetic-pole boundary line Ld therebetween, without reducing the widths of the straight portions 31*a* and 32*a*.

Moreover, in those regions where the straight portions 31*a* and 32*a* of the first and second through-holes 31 and 32 are spaced apart from each other, i.e., in those regions where the inter-pole bridge pieces 33 are formed, there are also formed outer peripheral bridge pieces 31*c* and 32*c* constituting pieces of the outer peripheral bridge portions 22*d* and 22*e* of the rotor core 22. The inter-pole bridge pieces 33 and the outer peripheral bridge pieces 31*c* and 32*c* are connected with each other and thus in a rational relationship of supporting each other. On the other hand, in those regions where the straight portions 31*a* and 32*a* of the first and second through-holes 31 and 32 are merged with each other, there are formed no outer peripheral bridge pieces 31*c* and 32*c* constituting pieces of the outer peripheral bridge portions 22*d* and 22*e* of the rotor core 22. Furthermore, in each of the curved portions 31*b* of the first through-holes 31, there is formed a reinforcement bridge piece 31*d* constituting a piece of the corresponding reinforcement bridge portion 22*c* of the rotor core 22. On the other hand, in each of the curved portions 32*b* of the second through-holes 32, there is formed no reinforcement bridge piece 31*d*.

Outer core portions 34*a*, which constitute pieces of the outer core portions 25 of the rotor core 22, are formed so as to be respectively surrounded by the first through-holes 31. Each of the outer core portions 34*a* is supported at two locations, i.e., the location where the corresponding reinforcement bridge piece 31*d* is formed and the location where the corresponding outer peripheral bridge piece 31*c* is formed so as to be connected with the corresponding inter-pole bridge piece 33. On the other hand, outer core portions 34*b*, which also constitute pieces of the outer core portions 25 of the rotor core 22, are formed so as to be respectively surrounded by the second through-holes 32. Each of the outer core portions 34*b* is supported at only one location, i.e., the location where the corresponding outer peripheral bridge piece 32*c* is formed so as to be connected with the corresponding inter-pole bridge piece 33. In each of the core sheets 30, the support rigidity of each of the outer core portions 34*a* and 34*b* is not very high. However, in the present embodiment, the rotor core 22 is formed by laminating (i.e., performing so-called rotational buildup on) those core sheets 30 which are arranged at the first position shown in FIG. 3(*a*) and those core sheets 30 which are arranged at the 45°—rotated second position shown in FIG. 3(*b*). In the rotor core 22 formed by the rotational buildup of the core sheets 30, each of the outer core portions 25 is supported at three locations, i.e., the location where the corresponding reinforcement bridge portion 22*c* is formed and the two locations where the corresponding outer peripheral bridge portions 22*d* and 22*e* are respectively formed. Consequently, the support rigidity of the outer core portions 25 is increased.

In each of the first through-holes 31, there is formed a tapered portion 31*e* at the radially outer end of the straight portion 31*a* that is located counterclockwise from the corresponding magnetic-pole centerline Ls, more specifically at the conner on the inner side of the folded substantially V-shape of the first through-hole 31. Moreover, in each of the first through-holes 31, there is also formed a tapered portion 31*f* at the radially outer end of the straight portion 31*a* that is located clockwise from the corresponding magnetic-pole centerline Ls, more specifically at the conner on the inner side of the folded substantially V-shape of the first through-hole 31. Similarly, in each of the second through-holes 32, there is formed a tapered portion 32*d* at the radially outer end of the straight portion 32*a* that is located counterclockwise from the corresponding magnetic-pole centerline Ls, more specifically at the conner on the inner side of the folded substantially V-shape of the second through-hole 32. Moreover, in each of the second through-holes 32, there is also formed a tapered portion 32*e* at the radially outer end of the straight portion 32*a* that is located clockwise from the corresponding magnetic-pole centerline Ls, more specifically at the conner on the inner side of the folded substantially V-shape of the second through-hole 32. Each of the tapered portions 31*e*, 31*f*, 32*d* and 32*e* has its inner edge protruding obliquely inward. Moreover, the protruding amount of the tapered portions 31*e* and 32*e* are set to be greater than the protruding amount of the tapered portions 31*f* and 32*d*.

In the present embodiment, in manufacturing the rotor 20 that includes the rotor core 22, the core sheets 30 are laminated in the axial direction so that those core sheets 30 which are arranged at the first position shown in FIG. 3(*a*) and those core sheets 30 which are arranged at the 45°—rotated second position shown in FIG. 3(*b*) alternate in units of one core sheet 30. Consequently, the first through-holes 31 and the second through-holes 32 overlap alternately in the axial direction; thus, each of the magnet-receiving holes 24 of the rotor core 22 is constituted of the first and second through-holes 31 and 32 that overlap each other in the axial direction.

In the axial view shown in FIG. 2, in each of the magnet-receiving holes 24 of the first type A1 and thus in each of the magnetic poles 26 of the first type A1, one of the first through-holes 31 of the core sheets 30 appears on the axial end face of the rotor core 22. Specifically, each of the magnet-receiving holes 24 of the first type A1 includes one of the first through-holes 31 of a first one of the core sheets 30 and one of the second through-holes 32 of a second one of the core sheets 30. That is, each of the magnet-receiving holes 24 of the first type A1 is constituted of the first through-holes 31 of the odd-numbered core sheets 30 and the second through-holes 32 of the even-numbered core sheets 30. In contrast, in the axial view shown in FIG. 2, in each of the magnet-receiving holes 24 of the second type A2 and thus in each of the magnetic poles 26 of the second type A2, one of the second through-holes 32 of the core sheets 30 appears on the axial end face of the rotor core 22. Specifically, each of the magnet-receiving holes 24 of the second type A2 includes one of the second through-holes 32 of the first core sheet 30 and one of the first through-holes 31 of the second core sheet 30. That is, each of the magnet-receiving holes 24 of the second type A2 is constituted of the second through-holes 32 of the odd-numbered core sheets 30 and the first through-holes 31 of the even-numbered core sheets 30.

Moreover, in the present embodiment, each of the first through-holes 31 of the core sheets 30 is offset counterclockwise from the magnetic-pole centerline Ls of the corresponding magnetic pole 26, whereas each of the second through-holes 32 of the core sheets 30 is offset clockwise from the magnetic-pole centerline Ls of the corresponding magnetic pole 26. Consequently, each of the magnet-receiving holes 24 of the first and second types A1 and A2 is zigzag-shaped in the axial direction. That is, interior surfaces of the magnet-receiving holes 24 are configured to have irregular portions. Therefore, the permanent magnets 23, which are formed respectively in the magnet-receiving holes 24 by injection molding, have portions thereof located respectively in the irregular portions of the interior surfaces of the magnet-receiving holes 24. Consequently, the permanent magnets 23 are firmly joined to the interior surfaces of the magnet-receiving holes 24.

In addition, in the case of the number of the core sheets 30 laminated to form the rotor core 22 being set to an even number, each of the magnet-receiving holes 24 of the first type A1 is constituted of the same number of the first and second through-holes 31 and 32 as each of the magnet-receiving holes 24 of the second type A2. Therefore, although the shapes of the magnet-receiving holes 24 of the first type A1 are different from the shapes of the magnet-receiving holes 24 of the second type A2 on the axial end faces of the rotor core 22, all the magnetic poles 26 of the first and second types A1 and A2 have substantially the same configuration. In the present embodiment, the rotor core 22 may be formed of, for example, an even number of core sheets 30.

Each adjacent pair of the core sheets 30 in the lamination direction may be fixed together by, for example, an adhesive (not shown). Alternatively, each adjacent pair of the core sheets 30 in the lamination direction may be fixed together by, for example, staking portions 35 (see FIG. 2). Each of the staking portions 35 is constituted of recesses formed in front surfaces of the core sheets 30 and protrusions formed on back surfaces of the core sheets 30. For each adjacent pair of the core sheets 30 in the lamination direction, the protrusions formed on the back surface of one of the pair of the core sheets 30 may be respectively fitted into the recesses formed in the front surface of the other of the pair of the core sheets 30. It is preferable to set the positions of the staking portions 35 in the rotor core 22 such that in each of the outer core portions 25, there is formed one staking portion 35 near the center of the outer core portion 25 on the magnetic-pole centerline Ls of the corresponding magnetic pole 26. It should be noted that the arrangement and number of the staking portions are not limited to this example, but may be changed as appropriate.

Next, operation of the present embodiment will be described.

Figure 4:
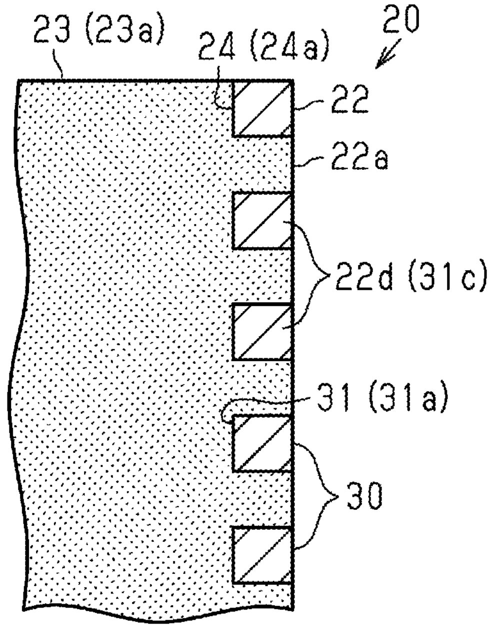
FIG. 4 is a cross-sectional view, taken along the line 4-4 in FIG. 2, of the rotor according to the embodiment.
Figure 5:
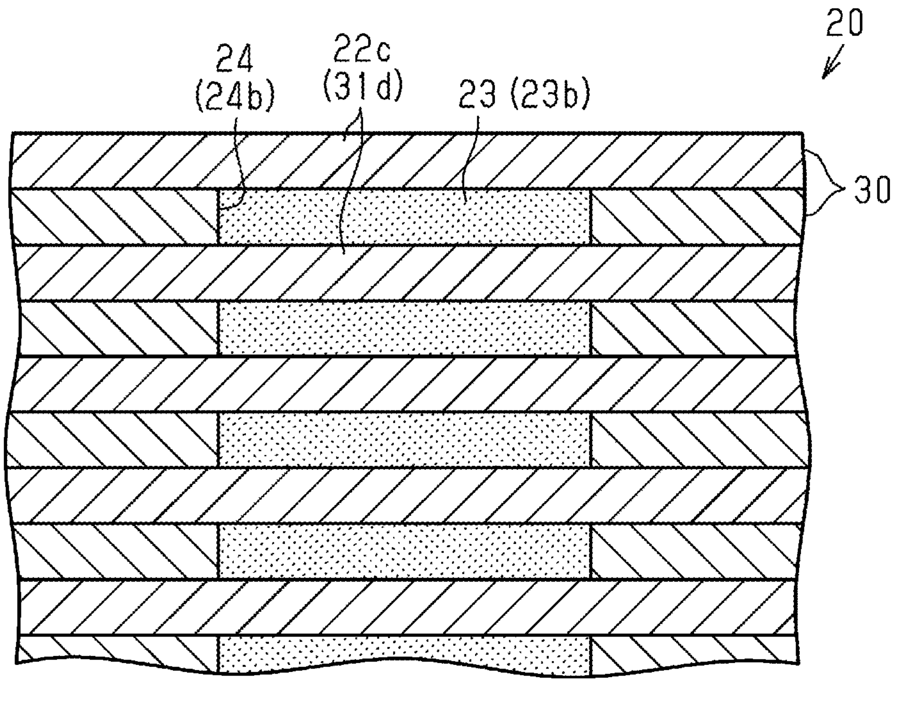
FIG. 5 is a cross-sectional view, taken along the line 5-5 in FIG. 2, of the rotor according to the embodiment.

As shown in FIG. 2, in the rotor 20 according to the present embodiment, each of the outer core portions 25 of the magnetic poles 26 is supported at three locations, i.e., the location where the corresponding reinforcement bridge portion 22*c* is formed and the two locations where the corresponding outer peripheral bridge portions 22*d* and 22*e* are respectively formed. In contrast, as shown in FIG. 3(*a*), in each of the core sheets 30, each of the outer core portions 34*a*, which are respectively surrounded by the first through-holes 31, is supported at two locations, i.e., the location where the corresponding reinforcement bridge piece 31*d* is formed and the location where the corresponding outer peripheral bridge piece 31*c* is formed. On the other hand, each of the outer core portions 34*b*, which are respectively surrounded by the second through-holes 32, is supported at only one location, i.e., the location where the corresponding outer peripheral bridge piece 32*c* is formed. By manufacturing the rotor core 22 through the rotational buildup of the core sheets 30, it becomes possible to have each of the outer core portions 25 supported at the three locations where the corresponding reinforcement bridge portion 22*c* and the corresponding outer peripheral bridge portions 22*d* and 22*e* are respectively formed. Consequently, in the resultant rotor core 22, the support rigidity of the outer core portions 25 becomes high; and the strength of the rotor core 22 (i.e., the strength of the rotor 20) against the centrifugal force becomes sufficient. Moreover, as shown in FIGS. 4 and 5, in the reinforcement bridge portions 22*c* and the outer peripheral bridge portions 22*d* and 22*e*, the presence and absence of the reinforcement bridge pieces 31*d* and the outer peripheral bridge pieces 31*c* and 32*c* in the core sheets 30 alternate in the axial direction in units of one core sheet 30. That is, the reinforcement bridge portions 22*c* and the outer peripheral bridge portions 22*d* and 22*e* are moderately discontinued in the axial direction. Consequently, magnetic flux leaking through the reinforcement bridge portions 22*c* and the outer peripheral bridge portions 22*d* and 22*e*, which is a concern, can be reduced. As a result, with the configuration of the rotor 20 according to the present embodiment, it becomes possible to reduce leakage magnetic flux while ensuring the strength thereof against the centrifugal force.

Figure 6:
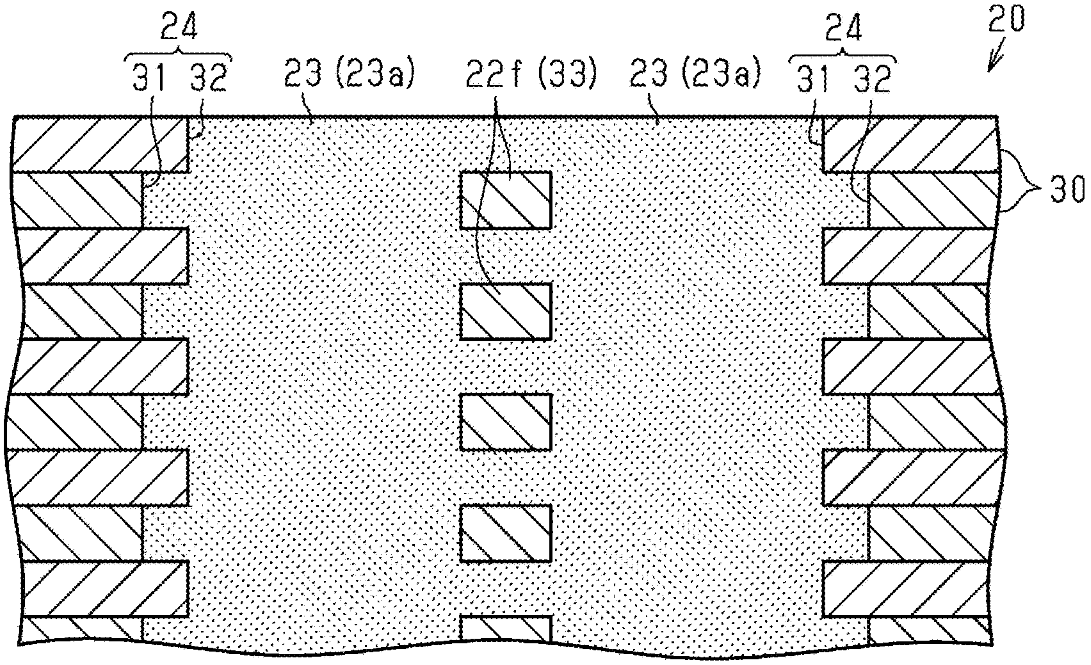
FIG. 6 is a cross-sectional view, taken along the line 6-6 in FIG. 2, of the rotor according to the embodiment.

Moreover, as shown in FIG. 2, in consideration of the rotational buildup of the rotor core 22, each of the magnet-receiving holes 24 is configured to have the first and second through-holes 31 and 32 of the core sheets 30 mixed therein in the axial direction. Consequently, each of the magnet-receiving holes 24 is zigzag-shaped in the axial direction; thus, irregular portions are formed in the interior surfaces of the magnet-receiving holes 24. During the molding of the permanent magnets 23, part of the magnet material flows into the irregular portions of the interior surfaces of the magnet-receiving holes 24. Consequently, the permanent magnets 23 are firmly joined to the rotor core 22. Thus, the rigidity of the entire rotor 20 is improved. Furthermore, the protruding amounts are varied for the tapered portion 31*e*, 31*f*, 32*d* and 32*e* of the first and second through-holes 31 and 32 of the core sheets 30; thus, tapered portions 23*c* of the permanent magnets 23, which are formed at corners on the inner side of the folded substantially V-shape of the permanent magnets 23, also have irregularities in the axial direction. Consequently, the permanent magnets 23 are firmly joined to the rotor core 22 at the tapered portions 23*c* as well. In addition, as shown in FIGS. 4 to 6, the reinforcement bridge portions 22*c*, the outer peripheral bridge portions 22*d* and 22*e* and the inter-pole bridge portions 22*f* are configured to be moderately discontinued in the axial direction; thus, part of the magnet material forming the permanent magnets 23 flows into the discontinued portions of these bridge portions. Consequently, the permanent magnets 23 are firmly joined to the rotor core 22 at these bridge portions as well. Thus, the rigidity of the entire rotor 20 is further improved.

Hereinafter, the results of various comparative investigations conducted regarding the shape and arrangement of the permanent magnets 23 of the rotor 20 will be described.

Figure 7:
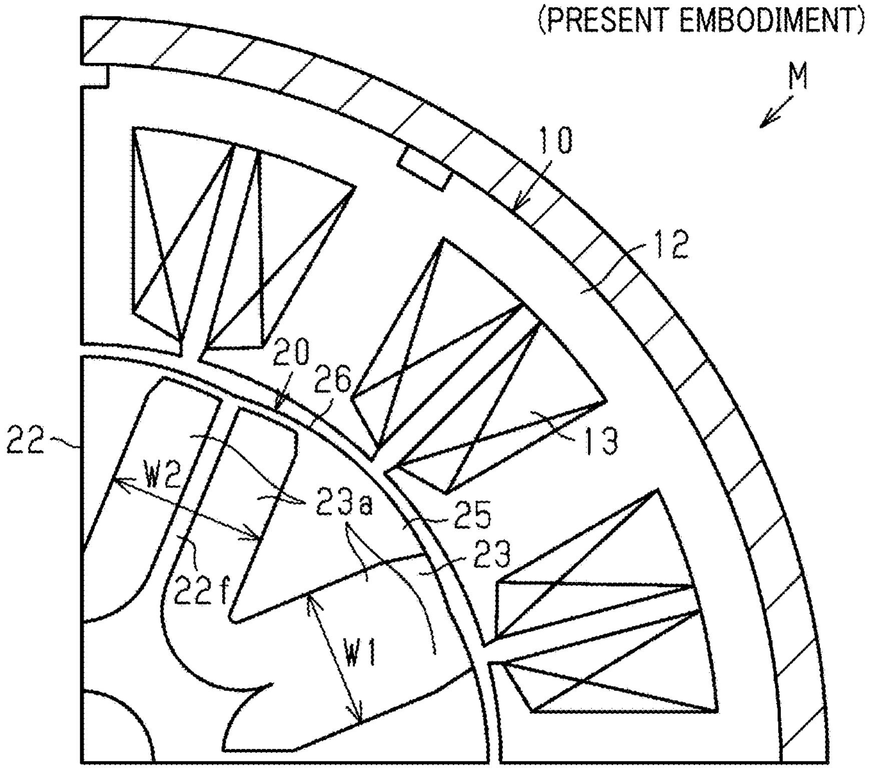
FIG. 7 is another configuration diagram of the rotating electric machine which includes the rotor according to the embodiment.
Figure 8:
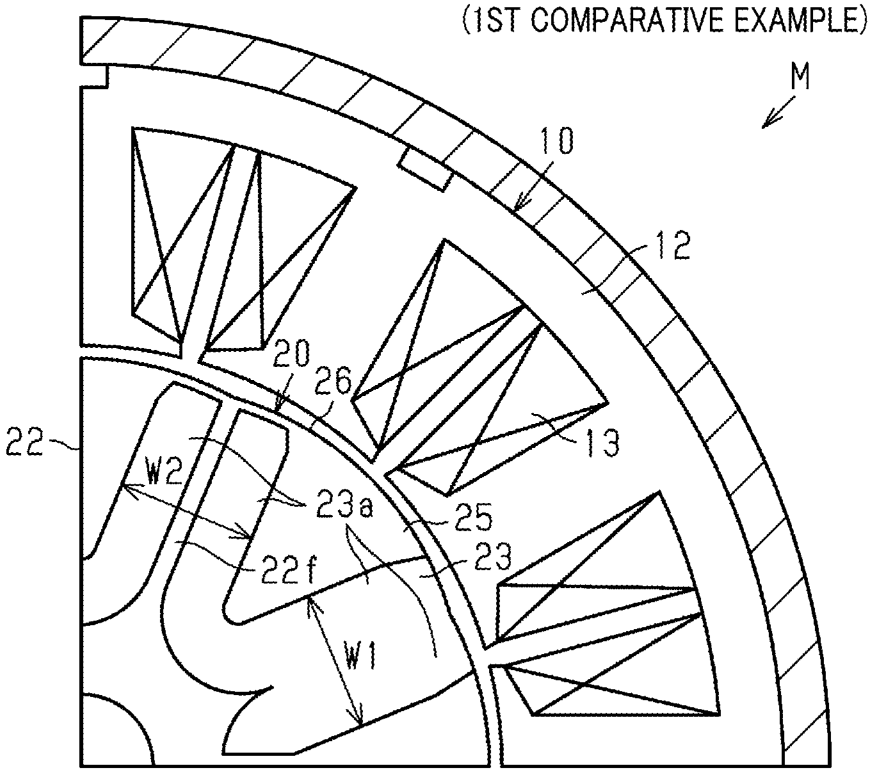
FIG. 8 is a configuration diagram of a rotating electric machine which includes a rotor according to a first comparative example.
Figure 9:
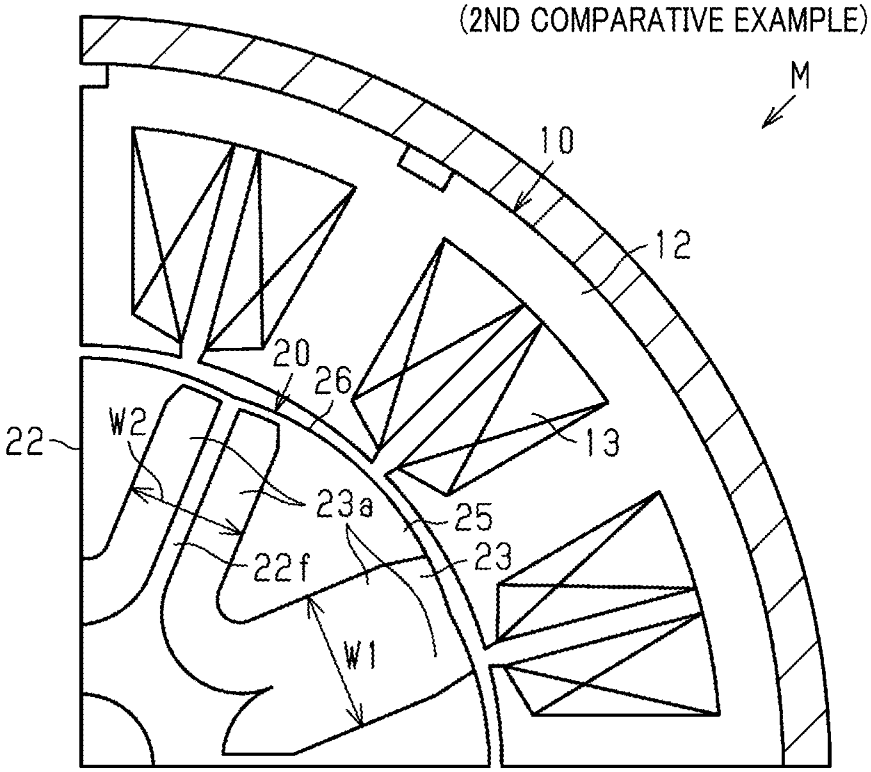
FIG. 9 is a configuration diagram of a rotating electric machine which includes a rotor according to a second comparative example.

First, the results of a comparative investigation conducted for the total widths W1 and W2 of the adjacent straight portions 23*a* of the permanent magnets 23 of the adjacent magnetic poles 26 will be described. The total width W1 is the sum of the widths of the adjacent straight portions 23*a* of the permanent magnets 23 of each adjacent pair of the magnetic poles 26 having no inter-pole bridge portion 22*f* (or no inter-pole bridge pieces 33) formed therebetween; the adjacent straight portions 23*a* are merged with each other. In contrast, the total width W2 is the sum of the widths of the adjacent straight portions 23*a* of the permanent magnets 23 of each adjacent pair of the magnetic poles 26 having the inter-pole bridge portion 22*f* (or the inter-pole bridge pieces 33) formed therebetween; the total width W2 also includes the width of the inter-pole bridge portion 22*f*. FIG. 7 illustrates the configuration of the rotor 20 according to the present embodiment. As can be seen from FIG. 7, in the present embodiment, the widths of the pair of straight portions 23*a* in each of the permanent magnets 23 are set to be equal to each other. Therefore, the total width W2 is greater than the total width W1 (i.e., W1<W2) by the width of each of the inter-pole bridge portions 22*f* formed between the adjacent magnetic poles 26. FIG. 8 illustrates the configuration of a rotor 20 according to a first comparative example. FIG. 9 illustrates the configuration of a rotor 20 according to a second comparative example. In the first and second examples, the width of the straight portions 23*a* each being adjacent to one of the inter-pole bridge portions 22*f* is set to be less than the width of the straight portions 23*a* each being adjacent to none of the inter-pole bridge portions 22*f*. Moreover, in the first comparative example, the total width W2 and the total width W1 are set to be equal to each other (i.e., W1=W2). On the other hand, in the second comparative example, the total width W1 is set to be greater than the total width W2 (i.e., W1>W2).

Figure 10:
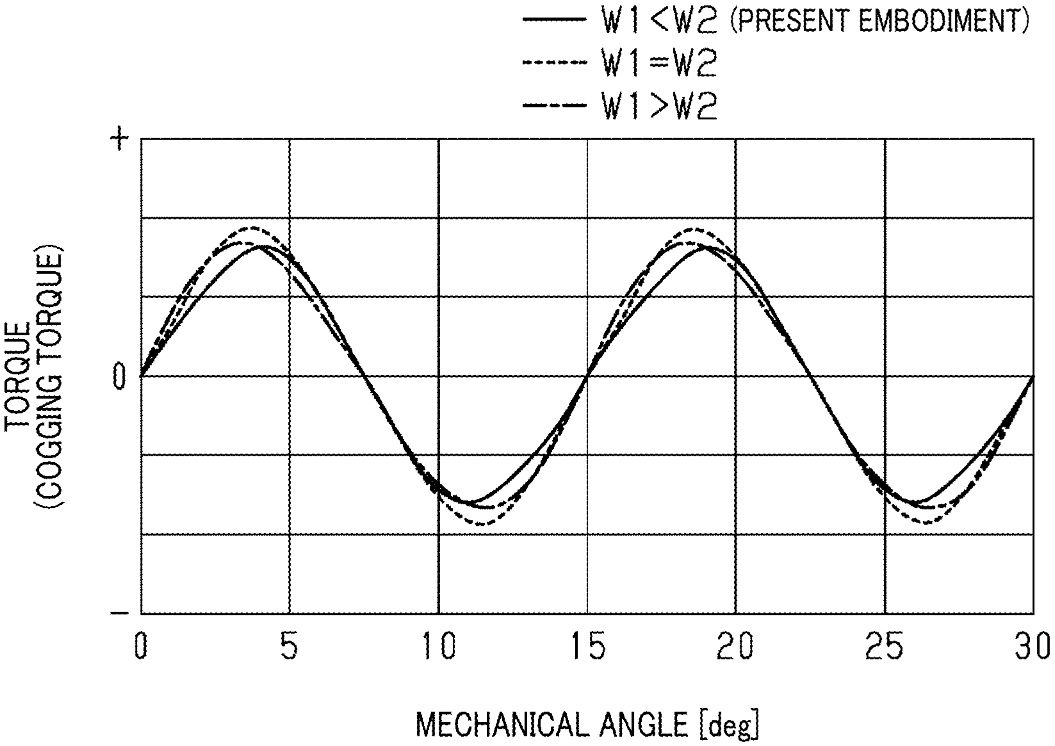
FIG. 10 is a comparison diagram of torque (more specifically, cogging torque) between various shapes of permanent magnets.

FIG. 10 shows variation in the torque of the rotating electric machine M. Specifically, FIG. 10 shows the magnitude of the cogging torque when no electric current is applied to the rotating electric machine M. It can be seen from FIG. 10 that in the case of employing the rotor 20 according to the present embodiment where the total widths W1 and W2 are set to satisfy (W1<W2), the cogging torque of the rotating electric machine M is suppressed most. In contrast, in the case of employing the rotor 20 according to the second comparative example where the total widths W1 and W2 are set to satisfy (W1>W2), the cogging torque is slightly higher than in the case of employing the rotor 20 according to the present embodiment. Moreover, in the case of employing the rotor 20 according to the first comparative example where the total widths W1 and W2 are set to satisfy (W1=W2), the cogging torque is slightly higher than in the case of employing the rotor 20 according to the second comparative example.

Figure 11:
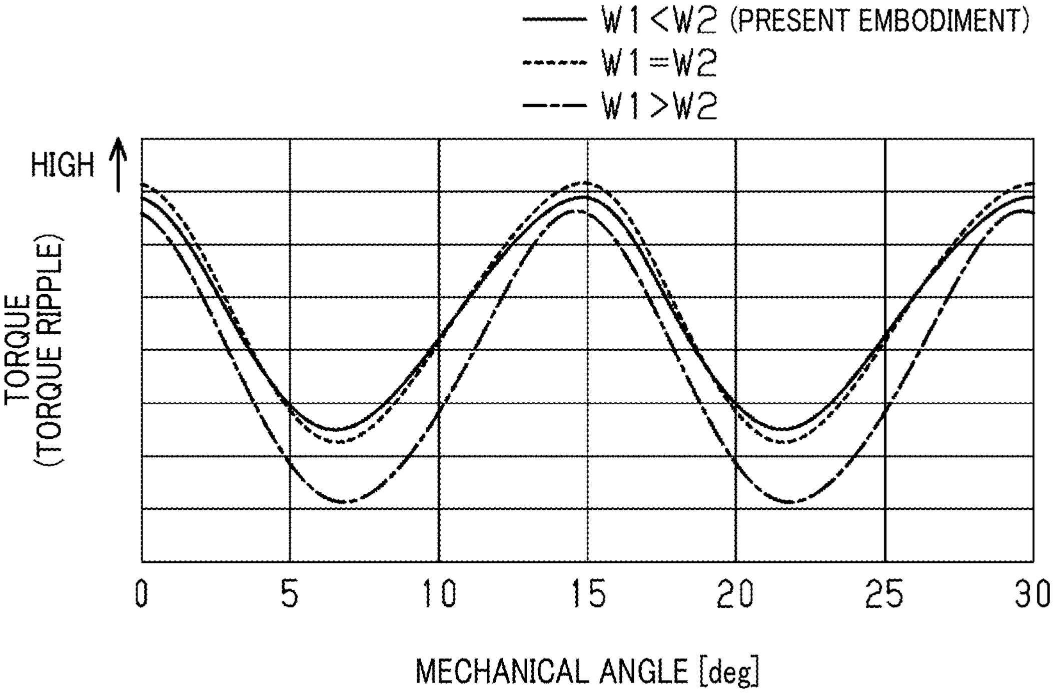
FIG. 11 is a comparison diagram of torque (more specifically, torque ripple) between the various shapes of permanent magnets.

FIG. 11 also shows variation in the torque of the rotating electric machine M. Specifically, FIG. 11 shows the magnitude of the torque ripple when electric current is applied to the rotating electric machine M. It can be seen from FIG. 11 that in the case of employing the rotor 20 according to the present embodiment where the total widths W1 and W2 are set to satisfy (W1<W2), the torque of the rotating electric machine M is high and the torque ripple is suppressed sufficiently. In contrast, in the case of employing the rotor 20 according to the first comparative example where the total widths W1 and W2 are set to satisfy (W1=W2), the torque is slightly higher, but the torque ripple is also slightly higher than in the case of employing the rotor 20 according to the present embodiment. Moreover, in the case of employing the rotor 20 according to the second comparative example where the total widths W1 and W2 are set to satisfy (W1>W2), the torque is slightly lower and the torque ripple is slightly higher than in the case of employing the rotor 20 according to the present embodiment. In addition, since the results obtained with the rotors according to the first and second comparative examples are fully acceptable, it is also possible to employ the rotors according to the first and second comparative examples.

Next, the results of a comparative investigation conducted regarding the presence or absence and shapes of the tapered portions 31*e*, 31*f*, 32*d* and 32*e* of the first and second through-holes 31 and 32 will be described; the first and second through-holes 31 and 32 constitute the magnet-receiving holes 24. That is, this comparative investigation was conducted regarding the presence or absence and shapes of the tapered portions 23*c* at the corners of the permanent magnets 23.

Figure 12:
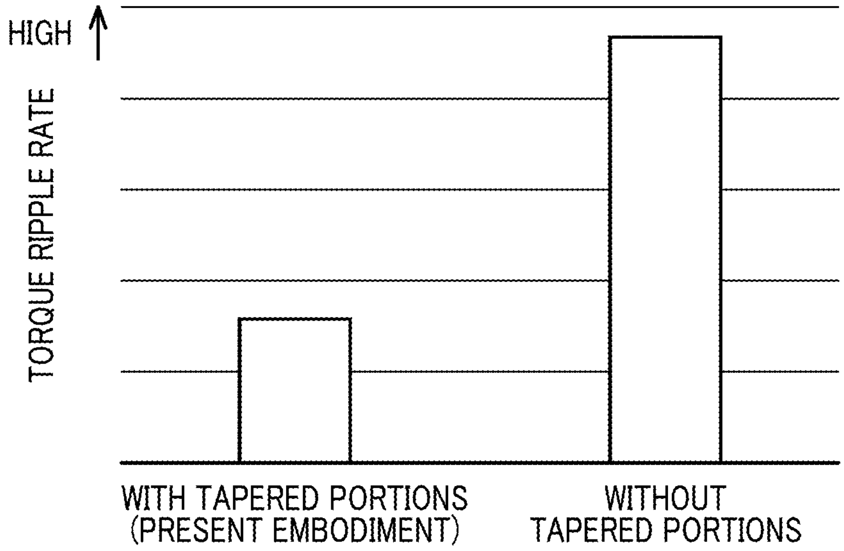
FIG. 12 is a comparison diagram of torque ripple rate between permanent magnets having tapered portions and permanent magnets having no tapered portions.

FIG. 12 shows the torque ripple rate of the rotating electric machine M. As can be seen from FIG. 12, in the case of employing the rotor 20 according to the present embodiment where the tapered portions 23*c* are formed at the corners of the permanent magnets 23, the torque ripple rate is suppressed in comparison with the case of employing a rotor 20 (not shown) according to a comparative example where no tapered portions are formed at the corners of the permanent magnets 23. In addition, since the results obtained with the rotor 20 according to the comparative example, where no tapered portions are formed at the corners of the permanent magnets 23, are fully acceptable, it is also possible to employ the rotor 20 according to the comparative example.

Figure 13:
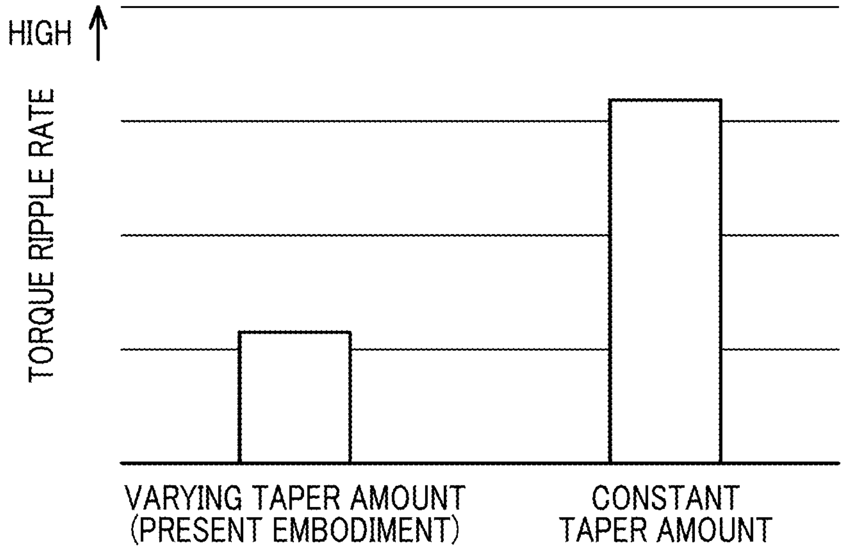
FIG. 13 is a comparison diagram of torque ripple rate between tapered portions whose size is varied in an axial direction and tapered portions whose size is kept constant in the axial direction.

FIG. 13 also shows the torque ripple rate of the rotating electric machine M. Specifically, FIG. 13 gives a comparison in the torque ripple rate between the case of employing the rotor 20 according to the present embodiment where the size (denoted by taper amount in FIG. 13) of the tapered portions 23*c* formed at the corners of the permanent magnets 23 is varied in the axial direction and the case of employing a rotor 20 (not shown) according to a comparative example where the size of the tapered portions 23*c* is kept constant in the axial direction. As can be seen from FIG. 13, in the case of employing the rotor 20 according to the present embodiment where the size of the tapered portions 23*c* is varied in the axial direction, the torque ripple rate is suppressed in comparison with the case of employing the rotor 20 according to the comparative example where the size of the tapered portions 23*c* is kept constant in the axial direction. In addition, since the results obtained with the rotor 20 according to the comparative example, where the size of the tapered portions 23*c* is kept constant in the axial direction, are fully acceptable, it is also possible to employ the rotor 20 according to the comparative example.

Next, effects of the present embodiment will be described.

(1) In the present embodiment, each of the outer core portions 25, which are surrounded by the magnet-receiving holes 24 and thus the permanent magnets 23, is supported with respect to the peripheral portion of the rotor core 22 at three locations, i.e., the two locations where the corresponding pair of outer peripheral bridge portions 22*d* and 22*e* are respectively formed and the location where the corresponding reinforcement bridge portion 22*c* is formed. Specifically, in each of the core sheets 30, there are formed two types of outer core portions each constituting a piece of a corresponding one of the outer core portions 25 of the rotor core 22, i.e., outer core portions 34*a* and outer core portions 34*b*. Each of the outer core portions 34*a* is supported by both the corresponding outer peripheral bridge piece 31*c* and the corresponding reinforcement bridge piece 31*d*. In contrast, each of the outer core portions 34*b* is supported by only the corresponding outer peripheral bridge piece 32*c*. In the rotor core 22 formed by laminating the core sheets 30, each of the outer core portions 25 is supported at the three locations where the corresponding outer peripheral bridge portions 22*d* and 22*e* and the corresponding reinforcement bridge portion 22*c* are respectively formed. Consequently, the support rigidity of the outer core portions 25, each of which is supported by the three bridge portions 22*d*, 22*e* and 22*c*, becomes sufficiently high; thus, the strength of the rotor 20 against the centrifugal force can be ensured. Moreover, each of the outer core portions 25 of the rotor core 22 is constituted of a mixture of the outer core portions 34*a* and 34*b* of the core sheets 30. Therefore, in each of the bridge portions 22*d*, 22*e* and 22*c* that support the outer core portions 25 of the rotor core 22, the bridge pieces 31*c*, 32*c* or 31*d* constituting the bridge portion are moderately spaced apart from one another. Consequently, magnetic flux leaking through the bridge portions 22*d*, 22*e* and 22*c*, which is a concern, can be reduced.

In addition, each of the outer peripheral bridge portions 22*d* corresponds to a first bridge portion. Each of the outer peripheral bridge portions 22*e* corresponds to a second bridge portion. Each of the reinforcement bridge portions 22*c* corresponds to a third bridge portion. Each of the outer peripheral bridge pieces 31*c* corresponds to a first bridge piece. Each of the outer peripheral bridge pieces 32*c* correspond to a second bridge piece. Each of the reinforcement bridge pieces 31*d* corresponds to a third bridge piece.

(2) In each of the core sheets 30, there are formed both the first through-holes 31 and the second through-holes 32 that are arranged alternately in the circumferential direction. Each of the first through-holes 31 has both the corresponding outer peripheral bridge piece 31*c* and the corresponding reinforcement bridge piece 31*d* formed immediately adjacent to it. In contrast, each of the second through-holes 32 has the corresponding outer peripheral bridge piece 32*c* formed immediately adjacent to it. The rotor core 22 is formed by rotating and laminating the core sheets 30 in units of predetermined numbers of the core sheets 30, more particularly in units of one core sheet 30 in the present embodiment, so that the first through-holes 31 and the second through-holes 32 coexist in each of the magnet-receiving holes 24. That is, the rotor core 22 according to the present embodiment can be formed using the core sheets 30 of a single type; thus, it can be realized with a simple measure.

(3) The rotor core 22 is formed by rotating and laminating the core sheets 30 in units of the same number of the core sheets 30, more particularly in units of one core sheet 30 in the present embodiment. Consequently, the rotational balance of the rotor 20 that employs the rotor core 22 can be improved.

(4) The rotor core 22 has the inter-pole bridge portions 22*f* each of which is formed between the magnet-receiving holes 24 of an adjacent pair of the magnetic poles 26. Each of the core sheets 30 is configured so that each of the first through-holes 31 is spaced apart from the second through-hole 32 located adjacent to and on one side of the first through-hole 31 with the corresponding inter-pole bridge piece 33 formed therebetween, and is merged with the second through-hole 32 located adjacent to and on the other side of the first through-hole 31 with no inter-pole bridge piece 33 formed therebetween. Moreover, only at each of the locations where the inter-pole bridge pieces 33 are respectively present, there are formed both the corresponding outer peripheral bridge pieces 31*c* and 32*c*. Consequently, each of the inter-pole bridge pieces 33 and the corresponding outer peripheral bridge pieces 31*c* and 32*c* are connected with each other and thus in a rational relationship of supporting each other.

In addition, each of the inter-pole bridge portions 22*f* corresponds to a fourth bridge portion. Each of the inter-pole bridge pieces 33 corresponds to a fourth bridge piece.

(5) The total width W1 and the total width W2 are set to be different from each other. The total width W1 is the sum of the widths of each adjacent pair of the straight portions 23*a* of the permanent magnets 23 which are merged with each other with no inter-pole bridge portion 22*f* formed therebetween. The total width W2 is the sum of the widths of each adjacent pair of the straight portions 23*a* of the permanent magnets 23 which are spaced apart from each other with the corresponding inter-pole bridge portion 22*f* formed therebetween, and the width of the corresponding inter-pole bridge portion 22*f*. More particularly, in the present embodiment, the total width W2 is set to be greater than the total width W1. Consequently, both the cogging torque and the torque ripple of the rotating electric machine M can be sufficiently suppressed.

In addition, each adjacent pair of the straight portions 23*a* of the permanent magnets 23 corresponds to each adjacent pair of juxtaposed portions of the permanent magnets. The total width W1 corresponds to a first total width. The total width W2 corresponds to a second total width.

(6) The permanent magnets 23 have the tapered portions 23*c* formed at the corners at the ends thereof on the outer peripheral side of the rotor core 22. More particularly, in the present embodiment, each of the permanent magnets 23 has a pair of tapered portions 23*c* formed respectively at the corners at the ends of the pair of straight portions 23*a* thereof; and the sizes of the pair of tapered portions 23*c* are set to be different from each other. Consequently, the torque ripple of the rotating electric machine M can be more sufficiently suppressed.

(7) Each of the first through-holes 31 is located at a position offset to one side in the circumferential direction from the magnetic-pole centerline Ls of the corresponding magnetic pole 26. In contrast, each of the second through-holes 32 is located at a position offset to the other side in the circumferential direction from the magnetic-pole centerline Ls of the corresponding magnetic pole 26. Each of the first and second through-holes 31 and 32 has the folded substantially V-shape that is asymmetrical with respect to the magnetic-pole centerline Ls of the corresponding magnetic pole 26. Each of the magnet-receiving holes 24 has the interior surface thereof formed with irregularities due to the coexistence of the first and second through-holes 31 and 32 in the magnet-receiving hole 24. Therefore, the permanent magnets 23, which are formed respectively in the magnet-receiving holes 24 by injection molding in the present embodiment, have portions thereof located respectively in the irregular portions of the interior surfaces of the magnet-receiving holes 24. Consequently, the permanent magnets 23 are firmly joined to the interior surfaces of the magnet-receiving holes 24. Moreover, since the permanent magnets 23 are firmly joined to the rotor core 22, the rigidity of the entire rotor 20 is improved.

The present embodiment can be modified and implemented as follows. Moreover, the present embodiment and the following modifications can also be implemented in combination with each other to the extent that there is no technical contradiction between them.

The above-described comparative examples can be regarded as modifications of the above-described embodiment. In other words, the above-described embodiment may be suitably modified as the above-described comparative examples. Moreover, the above-described embodiment and comparative examples may be combined with each other as appropriate.

The shapes of the magnet-receiving holes 24 and the first and second through-holes 31 and 32 are not limited to the exemplary shapes described above, but may be changed as appropriate. In this case, the shape of the permanent magnets 23, which are formed respectively in the magnet-receiving holes 24 by injection molding, is also changed.

Figure 14:
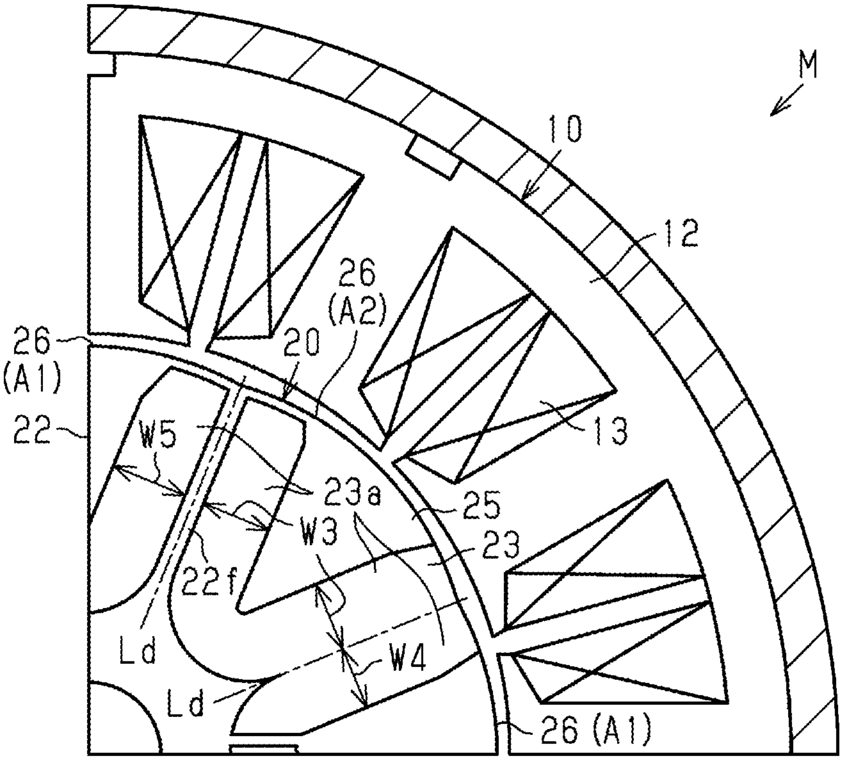
FIG. 14 is a configuration diagram of a rotating electric machine which includes a rotor according to a modification, wherein permanent magnets of adjacent magnetic poles have mutually different shapes.

In the above-described embodiment, for each adjacent pair of the magnetic poles 26, the fundamental shapes of the permanent magnets 23 of the pair of the magnetic poles 26 are set to be symmetrical with respect to the magnetic-pole boundary line Ld between the pair of the magnetic poles 26. Here, the fundamental shapes of the permanent magnets 23 denote the shapes of main bodies of the permanent magnets 23 excluding the tapered portions 23*c* and those portions of the permanent magnets 23 which relate to the bridge portions 22*c*, 22*d* and 22*e* of the magnet-receiving holes 24. Alternatively, as shown in FIG. 14, for each adjacent pair of the magnetic poles 26, the fundamental shapes of the permanent magnets 23 of the pair of the magnetic poles 26 may be modified to be different from each other and thus asymmetrical with respect to the magnetic-pole boundary line Ld between the pair of the magnetic poles 26. In the modification shown in FIG. 14, for each of the permanent magnets 23 of the magnetic poles 26 of the second type A2, the widths of the pair of straight portions 23*a* of the permanent magnet 23 are set to the same width W3. In contrast, for each of the permanent magnets 23 of the magnetic poles 26 of the first type A1, the widths of the pair of straight portions 23*a* of the permanent magnet 23 are respectively set to two different widths W4 and W5. That is, in this modification, the fundamental shapes of the permanent magnets 23 are modified by varying the widths of the straight portions 23*a* of the permanent magnets 23.

Figure 15:
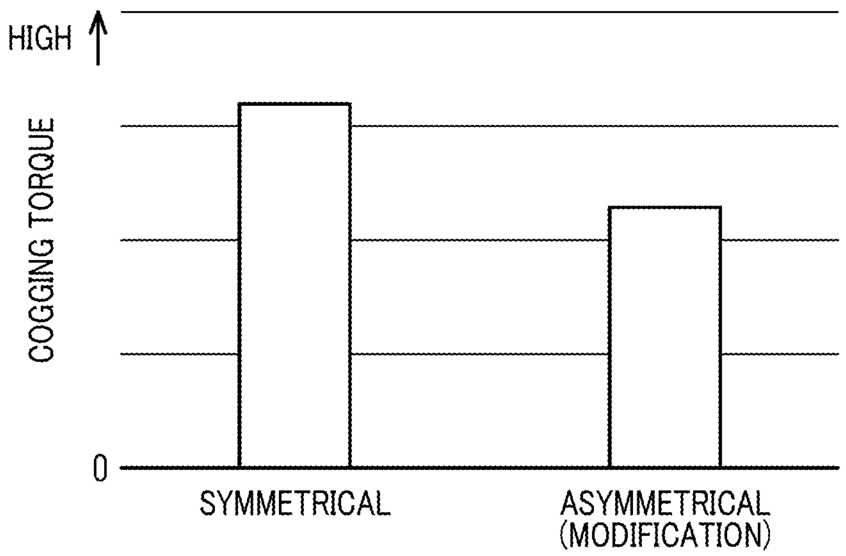
FIG. 15 is a comparison diagram of cogging torque between the rotor according to the embodiment and the rotor according to the modification.
Figure 16:
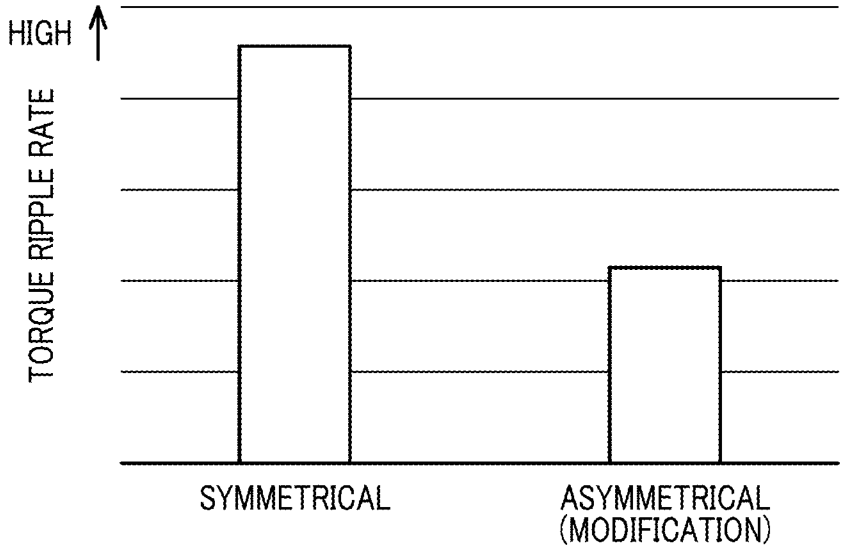
FIG. 16 is a comparison diagram of torque ripple rate between the rotor according to the embodiment and the rotor according to the modification.

FIGS. 15 and 16 respectively show the cogging torque and the torque ripple rate of the rotating electric machine M. As can be seen from FIGS. 15 and 16, in the case of employing the rotor 20 according to the modification shown in FIG. 14, both the cogging torque and the torque ripple rate are suppressed more than in the case of employing the rotor 20 according to the above-described embodiment; the fundamental shapes of the permanent magnets 23 of the adjacent magnetic poles 26 are set to be symmetrical with respect to the magnetic-pole boundary line Ld in the above-described embodiment, but set to be asymmetrical with respect to the magnetic-pole boundary line Ld in the modification shown in FIG. 14. In addition, since both the cogging torque and the torque ripple rate in the case of setting the fundamental shapes of the permanent magnets 23 to be symmetrical are fully acceptable, the symmetrical fundamental shapes of the permanent magnets 23 are employed in the above-described embodiment. As a matter of course, it is also possible to employ the asymmetrical fundamental shapes of the permanent magnets 23 as in the modification shown in FIG. 14.

In the above-described embodiment, each of the outer core portions 25 is supported at the three locations where the corresponding outer peripheral bridge portions 22*d* and 22*e* and the corresponding reinforcement bridge portion 22*c* are respectively formed. Alternatively, one of the aforementioned bridge portions may be eliminated so as to have each of the outer core portions 25 supported at two locations; otherwise, one or more bridge portions may be added to the aforementioned bridge portions so as to have each of the outer core portions 25 supported at four or more locations.

Moreover, the shapes, arrangements, presence or absence and combination of the outer peripheral bridge portions 22*d* and 22*e*, the reinforcement bridge portions 22*c* and the inter-pole bridge portions 22*f* of the rotor core 22, and thus those of the outer peripheral bridge pieces 31*c* and 32*c*, the reinforcement bridge pieces 31*d* and the inter-pole bridge pieces 33 of the core sheets 30 may also be changed as appropriate.

In the above-described embodiment, the rotor core 22 is formed by rotating and laminating the core sheets 30 in units of one core sheet 30. Alternatively, the rotor core 22 may be formed by rotating and laminating the core sheets 30 in units of predetermined numbers of the core sheets 30; the predetermined numbers are greater than or equal to two. Moreover, in this case, the predetermined numbers may be either the same number or different numbers.

In the above-described embodiment, the rotor core 22 is formed by rotating and laminating the core sheets 30 of a single type. Alternatively, the rotor core 22 may be formed by laminating a plurality of types of core sheets (not shown). In this case, the core sheets may be laminated with or without being rotated.

In the above-described embodiment, the curvature of each of the outer peripheral surfaces 26*a* of the magnetic poles 26 is set to be greater than the curvature in the case of the outer circumferential surface 22*a* of the rotor core 22 being formed as a uniform circular surface; thus, the outer circumferential surface 22*a* of the rotor core 22 has a wavy shape that is slightly convex radially outward at each of the magnetic poles 26. Alternatively, the outer circumferential surface 22*a* of the rotor core 22 may be formed as a uniform circular surface.

In the above-described embodiment, the permanent magnets 23 are manufactured by injection-molding the magnet material into the magnet-receiving holes 24 of the rotor core 22. Alternatively, the permanent magnets 23 may be manufactured in advance and inserted into and fixed in the magnet-receiving holes 24 of the rotor core 22.

The number of magnetic poles of the rotor 20, i.e., the number of the permanent magnets 23 and the number of the magnet-receiving holes 24 may be changed as appropriate. Moreover, the number of magnetic poles of the stator 10 may also be changed as appropriate.

In addition to the above modifications, the configuration of the rotating electric machine M may also be modified as appropriate.

It should be noted that the expression “at least one of A and B” in the present disclosure should be understood as meaning “only A, only B, or both A and B”.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A rotor comprising, a rotor core including a plurality of core sheets that are laminated together and having magnet-receiving holes formed in a folded shape that is convex radially inward; and permanent magnets embedded respectively in the magnet-receiving holes of the rotor core, wherein;

the rotor includes a plurality of magnetic poles;

each of the magnetic poles includes one of the permanent magnets which is located on a radially inner side in the rotor core and one of outer core portions of the rotor core which is located radially outside the permanent magnet;

each of the outer core portions of the rotor core is constituted of outer core portions of the core sheets which are laminated together;

each of the outer core portions of the rotor core is supported with respect to a peripheral portion of the rotor core by at least three bridge portions which include first and second bridge portions formed respectively at a pair of radially outer ends of a corresponding one of the magnet-receiving holes formed in the folded shape, and a third bridge portion formed to extend across the corresponding magnet-receiving hole at an intermediate position of the corresponding magnet-receiving hole;

the support of each of the outer core portions of the rotor core by the at least three bridge portions is established by laminating the core sheets so that each of the outer core portions of the rotor core includes those outer core portions of the core sheets each of which is supported by one or two of first, second and third bridge pieces of the core sheet, the first, second and third bridge pieces respectively constituting pieces of the first, second and third bridge portions;

in each of the core sheets, there are formed both first through-holes and second through-holes that are arranged alternately in a circumferential direction, each of the first through-holes having two of the first, second and third bridge pieces formed immediately adjacent to it, each of the second through-holes having the remaining one of the first, second and third bridge pieces formed immediately adjacent to it; and the rotor core is formed by rotating and laminating the core sheets, all of which are identical in configuration to each other, in units of predetermined numbers of the core sheets so that the first through-holes and the second through-holes coexist in each of the magnet-receiving holes.

2. The rotor as set forth in claim 1, wherein the rotor core is formed by rotating and laminating the core sheets in units of a same number of the core sheets.

3. The rotor as set forth in claim 1, wherein:

the rotor core further has fourth bridge portions each of which is formed between the magnet-receiving holes of an adjacent pair of the magnetic poles;

each of the core sheets is configured so that each of the first through-holes is spaced apart from the second through-hole located adjacent to and on one side of the first through-hole with a fourth bridge piece, which constitutes a piece of a corresponding one of the fourth bridge portions, formed therebetween, and is merged with the second through-hole located adjacent to and on the other side of the first through-hole with no fourth bridge piece formed therebetween; and only at each location where the fourth bridge piece is present, there are formed both the first and second bridge pieces.

4. The rotor as set forth in claim 3, wherein total widths of adjacent juxtaposed portions of the permanent magnets are set so that a first total width and a second total width are different from each other, the first total width being the sum of widths of each adjacent pair of the juxtaposed portions of the permanent magnets which are merged with each other with no fourth bridge portion formed therebetween, the second total width being the sum of widths of each adjacent pair of the juxtaposed portions of the permanent magnets which are spaced apart from each other with a corresponding one of the fourth bridge portions formed therebetween, and a width of the corresponding fourth bridge portion.

5. The rotor as set forth in claim 4, wherein the second total width is set to be greater than the first total width.

6. The rotor as set forth in claim 1, wherein:

each of the first through-holes is located at a position offset to one side in the circumferential direction from a magnetic-pole centerline of a corresponding one of the magnetic poles;

each of the second through-holes is located at a position offset to the other side in the circumferential direction from a magnetic-pole centerline of a corresponding one of the magnetic poles;

each of the first and second through-holes has a folded shape that is asymmetrical with respect to the magnetic-pole centerline of the corresponding magnetic pole; and each of the magnet-receiving holes has an interior surface thereof formed with irregularities due to the coexistence of the first and second through-holes in the magnet-receiving hole.

7. The rotor as set forth in claim 1, wherein for each adjacent pair of the magnetic poles, fundamental shapes of the permanent magnets of the pair of the magnetic poles are set to be asymmetrical with respect to a magnetic-pole boundary line between the pair of the magnetic poles.

8. A rotor comprising, a rotor core including a plurality of core sheets that are laminated together and having magnet-receiving holes formed in a folded shape that is convex radially inward; and permanent magnets embedded respectively in the magnet-receiving holes of the rotor core, wherein:

the rotor includes a plurality of magnetic poles;

each of the magnetic poles includes one of the permanent magnets which is located on a radially inner side in the rotor core and one of outer core portions of the rotor core which is located radially outside the permanent magnet;

each of the outer core portions of the rotor core is constituted of outer core portions of the core sheets which are laminated together;

each of the outer core portions of the rotor core is supported with respect to a peripheral portion of the rotor core by a plurality of bridge portions which include a bridge portion located at one of a pair of radially outer ends of a corresponding one of the magnet-receiving holes formed in the folded shape;

the support of each of the outer core portions of the rotor core by the plurality of bridge portions is established by laminating the core sheets so that each of the outer core portions of the rotor core includes, at least, those outer core portions of the core sheets each of which is supported by a single bridge piece of the core sheet, the single bridge piece constituting a piece of the bridge portion located at one of the pair of radially outer ends of the corresponding magnet-receiving hole;

each of the permanent magnets is formed in a folded shape with a pair of ends on an outer peripheral side of the rotor core, and has a pair of tapered portions formed respectively at corners at the pair of ends thereof; and sizes of the pair of tapered portions are set to be different from each other.

9. The rotor as set forth in claim 8, wherein for each adjacent pair of the magnetic poles, fundamental shapes of the permanent magnets of the pair of the magnetic poles are set to be asymmetrical with respect to a magnetic-pole boundary line between the pair of the magnetic poles.

10. A rotating electric machine comprising:

a rotor that comprises a rotor core including a plurality of core sheets that are laminated together and having magnet-receiving holes formed in a folded shape that is convex radially inward, and permanent magnets embedded respectively in the magnet-receiving holes of the rotor core; and a stator configured to apply a rotating magnetic field to the rotor, wherein:

the rotor includes a plurality of magnetic poles;

each of the magnetic poles includes one of the permanent magnets which is located on a radially inner side in the rotor core and one of outer core portions of the rotor core which is located radially outside the permanent magnet;

each of the outer core portions of the rotor core is constituted of outer core portions of the core sheets which are laminated together;

each of the outer core portions of the rotor core is supported with respect to a peripheral portion of the rotor core by at least three bridge portions which include first and second bridge portions formed respectively at a pair of radially outer ends of a corresponding one of the magnet-receiving holes formed in the folded shape, and a third bridge portion formed to extend across the corresponding magnet-receiving hole at an intermediate position of the corresponding magnet-receiving hole;

the support of each of the outer core portions of the rotor core by the at least three bridge portions is established by laminating the core sheets so that each of the outer core portions of the rotor core includes those outer core portions of the core sheets each of which is supported by one or two of first, second and third bridge pieces of the core sheet, the first, second and third bridge pieces respectively constituting pieces of the first, second and third bridge portions, in each of the core sheets, there are formed both first through-holes and second through-holes that are arranged alternately in a circumferential direction, each of the first through-holes having two of the first, second and third bridge pieces formed immediately adjacent to it, each of the second through-holes having the remaining one of the first second and third bridge pieces formed immediately adjacent to it; and the rotor core is formed by rotating and laminating the core sheets, all of which are identical in configuration to each other, in units of predetermined numbers of the core sheets so that the first through-holes and the second through-holes coexist in each of the magnet-receiving holes.

11. A rotating electric machine comprising:

a rotor that comprises a rotor core including a plurality of core sheets that are laminated together and having magnet-receiving holes formed in a folded shape that is convex radially inward, and permanent magnets embedded respectively in the magnet-receiving holes of the rotor core; and a stator configured to apply a rotating magnetic field to the rotor, wherein:

the rotor includes a plurality of magnetic poles;

each of the magnetic poles includes one of the permanent magnets which is located on a radially inner side in the rotor core and one of outer core portions of the rotor core which is located radially outside the permanent magnet;

each of the outer core portions of the rotor core is constituted of outer core portions of the core sheets which are laminated together;

each of the outer core portions of the rotor core is supported with respect to a peripheral portion of the rotor core by a plurality of bridge portions which include a bridge portion located at one of a pair of radially outer ends of a corresponding one of the magnet-receiving holes formed in the folded shape;

the support of each of the outer core portions of the rotor core by the plurality of bridge portions is established by laminating the core sheets so that each of the outer core portions of the rotor core includes, at least, those outer core portions of the core sheets each of which is supported by a single bridge piece of the core sheet, the single bridge piece constituting a piece of the bridge portion located at one of the pair of radially outer ends of the corresponding magnet-receiving hole;

each of the permanent magnets is formed in a folded shape with a pair of ends on an outer peripheral side of the rotor core, and has a pair of tapered portions formed respectively at corners at the pair of ends thereof; and sizes of the pair of tapered portions are set to be different from each other.

* * * * *